US008018294B2

(12) United States Patent
Watanabe

(10) Patent No.: US 8,018,294 B2
(45) Date of Patent: Sep. 13, 2011

(54) OSCILLATOR DEVICE, OPTICAL DEFLECTOR AND IMAGE FORMING APPARATUS USING THE OPTICAL DEFLECTOR

(75) Inventor: Ikuo Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 12/119,639

(22) Filed: May 13, 2008

(65) Prior Publication Data

US 2008/0284523 A1 Nov. 20, 2008

(30) Foreign Application Priority Data

May 17, 2007 (JP) .................. 2007-131351

(51) Int. Cl.
*H03B 5/30* (2006.01)
*G02B 26/08* (2006.01)

(52) U.S. Cl. ...... 331/154; 331/4; 359/199.1; 359/213.1; 359/224.1

(58) Field of Classification Search .......... 331/4, 116 M, 331/154; 359/197.1, 198.1, 199.1–199.4, 359/212.1, 212.2, 213.1, 214.1, 223.1, 224.1, 359/225.1, 226.1, 226.2, 871, 872
See application file for complete search history.

(56) References Cited

U.S. PATENT DOCUMENTS

| 6,844,951 | B2 * | 1/2005 | Cannon et al. | 359/199.3 |
| 7,030,708 | B2 * | 4/2006 | Klement | 331/154 |
| 7,064,876 | B2 * | 6/2006 | Cannon et al. | 359/204.1 |
| 7,149,017 | B2 * | 12/2006 | Kandori et al. | 359/202.1 |
| 7,271,943 | B2 * | 9/2007 | Yasuda et al. | 359/224.1 |
| 7,423,795 | B2 * | 9/2008 | Kato et al. | 359/224.1 |

FOREIGN PATENT DOCUMENTS

| JP | 2005-208578 | 8/2005 |
| JP | 2005-241482 | 9/2005 |
| JP | 2005-292627 | 10/2005 |

* cited by examiner

*Primary Examiner* — Levi Gannon
(74) *Attorney, Agent, or Firm* — Fitzpatrick, Cella, Harper & Scinto

(57) ABSTRACT

An oscillator device includes an oscillation system having an oscillator and an elastic supporting member, a detecting member for detecting oscillation amplitude of the oscillator, a driving member for driving the oscillator, and a control unit for generating a driving signal for driving the oscillator and for supplying the driving signal to the driving member, wherein the control unit reciprocally sweeps a driving frequency of the driving signal so that a resonance frequency of the oscillation system is included within a frequency range swept, wherein the control unit determines a resonance frequency based on at least two frequencies with which an oscillation amplitude value obtainable by the reciprocal sweeping reaches a maximum, and wherein the control unit generates the driving signal based on the determined resonance frequency.

13 Claims, 7 Drawing Sheets

OSCILLATOR DEVICE, OPTICAL DEFLECTOR AND IMAGE FORMING APPARATUS USING THE OPTICAL DEFLECTOR

FIELD OF THE INVENTION AND RELATED ART

This invention relates generally to the technical field of oscillator devices having an oscillator such as a microoscillation structure, for example. More particularly, the invention concerns an oscillator device having a function for detecting a resonance frequency of a resonance type oscillator. Optical deflecting devices using such an oscillator device are applicable to projectors or visual display units such as a scanning display unit, for example, printers such as a laser beam printer (LBP), or image forming apparatuses such as a digital copying machine.

A large variety of optical deflecting devices with a moving mirror have conventionally been proposed (see Japanese Laid-Open Patent Application No. 2005-208578 corresponding to U.S. Pat. No. 7,271,943, and Japanese Laid-Open Patent Application No. 2005-292627). Resonance type optical deflecting devices are characterized by the following features, as compared with optical scanning optical systems using a rotary polygonal mirror such as polygon mirror, for example. That is: the size of the optical deflecting device can be made very small, and the power consumption is low. Particularly, optical deflecting devices comprised of Si monocrystal and produced by semiconductor processes have advantages that theoretically there is no metal fatigue and that the durability is very good. In addition to conventional optical deflecting devices wherein a rotary polygonal mirror such as a polygon mirror is rotated, there is another one recently being developed and practiced. Namely, it is resonance type optical deflectors called "MEMS" (Micro Electro Mechanical Systems) wherein an oscillator oscillates around a rotation axis using a micromachine technique.

However, in order to drive the resonance type oscillator such as MEMS at high efficiency, since the Q-value of the resonance characteristic of such oscillator is very high as of around 1000, for example, it is necessary to drive the oscillator with a driving signal of a frequency sufficiently close to the resonance frequency of the oscillator. However, if Si is used as the material, this resonance frequency would have a negative temperature coefficient of around $-0.14$ Hz/° C. Therefore, it is required that, the current resonance frequency should be measured precisely every time the system is turned on, for example, and the oscillator should be driven based on the measurement result.

SUMMARY OF THE INVENTION

The present invention provides an oscillator device by which the resonance frequency can be measured precisely and at relatively high speed.

In accordance with an aspect of the present invention, there is provided an oscillator device, comprising: an oscillation system having an oscillator and an elastic supporting member; a detecting member configured to detect oscillation amplitude of said oscillator; a driving member configured to drive said oscillator; and a control unit configured to generate a driving signal for driving said oscillator and to supply the driving signal to said driving member; wherein said control unit reciprocally sweeps a driving frequency of the driving signal so that a resonance frequency of said oscillation system is included within a frequency range swept, wherein said control unit determines a resonance frequency based on at least two frequencies with which an oscillation amplitude value obtainable by the reciprocal sweeping reaches a maximum, and wherein said control unit generates the driving signal based on the determined resonance frequency.

In one preferred form of this aspect of the present invention, where a frequency with which the oscillation amplitude value reaches a maximum when in the reciprocal sweeping the frequency is swept by a forward stroke is denoted by fmax1 and where a frequency with which the oscillation amplitude value reaches a maximum when in the reciprocal sweeping the frequency is swept by a backward stroke is denoted by fmax2, said control unit determines a mean frequency (fmax1+fmax2)/2 of these frequencies fmax1 and fmax2 as the resonance frequency of said oscillation system.

After the driving frequency is swept by the forward stroke, said control unit may sweep the driving frequency by the backward stroke at a speed slower than the sweeping speed of the forward stroke.

After the frequency with which the oscillation amplitude value reaches a maximum is passed in the forward-stroke sweeping of the driving frequency, said control unit may stop the sweeping of the driving frequency as the oscillation amplitude starts to decrease, wherein said control unit may sweep the driving frequency by a backward stroke from a position where the forward-stroke sweeping was stopped, at a speed slower than the forward-stroke sweeping speed and determines a frequency with which the oscillation amplitude value again reaches a maximum as the resonance frequency of said oscillation system.

For sweeping the driving frequency, said control unit may successively change the driving frequency by a predetermined variation and holds the same driving frequency for a predetermined time after each variation is applied.

Said control unit may sweep the driving frequency by successively changing the same by a predetermined variation and, when the oscillation amplitude starts to decrease after the frequency with which the oscillation amplitude value reaches a maximum is passed, it may stop the driving frequency sweeping, wherein said control unit may sweep the driving signal by a backward stroke from the position where the forward-stroke sweeping was stopped, while successively changing the driving frequency by a predetermined variation which is smaller than the predetermined variation of the driving frequency in the forward stroke.

In the backward-stroke sweeping, said control unit may stop the driving frequency sweeping when the oscillation amplitude starts to decrease after the frequency with which the oscillation amplitude value reaches a maximum is passed, wherein said control unit may sweep the driving signal again by a forward stroke from the position where the backward-stroke sweeping was stopped, while successively changing the driving frequency by a predetermined variation which is smaller than the predetermined variation of the driving frequency in the backward-stroke sweeping.

Said control unit may repeat the reciprocal sweeping of the driving frequency until the variation of the driving frequency becomes smaller than a predetermined value.

The variation of the driving frequency as the oscillation amplitude of the oscillator is smaller than a predetermined threshold may be made greater than the variation of the driving frequency as the oscillation amplitude of the oscillator is larger than the predetermined threshold.

Said oscillation system may include a first oscillator, a second oscillator, a first resilient support member configured to support said first oscillator relative to said second oscillator for oscillating motion about a torsional axis, and a second resilient support member configured to support said second oscillator relative to a support member for oscillating motion about the torsional axis.

In accordance with another aspect of the present invention, there is provided an optical deflector, comprising: an oscillator device as recited above; and an optical deflecting element provided at said oscillator.

In accordance with a further aspect of the present invention, there is provided an image forming apparatus, comprising: an optical deflector as recited above; an optical system; a light source; and a photosensitive member; wherein a light beam from said light source is scanningly deflected by said optical deflector, and the deflected scanning light beam is collected at a target position on said photosensitive member through said optical system.

In accordance with the present invention, at least in the neighborhood of the resonance frequency of the oscillator, the frequency of the driving signal is reciprocally swept at least once, by which the resonance frequency of the oscillator can be detected precisely. Therefore, the resonance frequency of a particular oscillator, even if the same changes every time the system is started due to the temperature coefficient, can be detected precisely and at relatively high speed. Thus, the oscillator can be driven adequately based on it.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are diagrams for explaining an oscillator device according to the present invention, wherein FIG. 1A shows a structural example of a single oscillator, and FIG. 1B shows a structural example of dual oscillators.

DESCRIPTION OF THE PREFERRED EMBODIMENTS

Preferred embodiments of the present invention will now be described first.

[Structure of Oscillator Device]

Figure 1A:
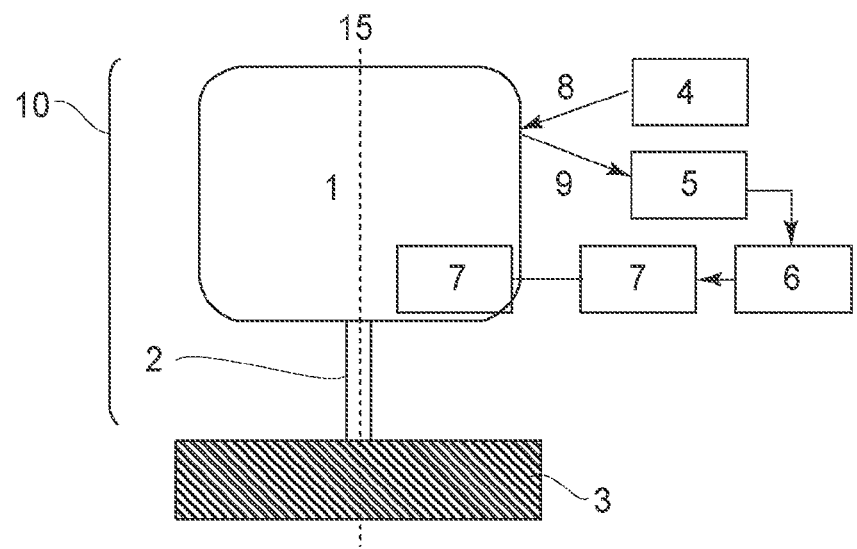
Figure 1B:
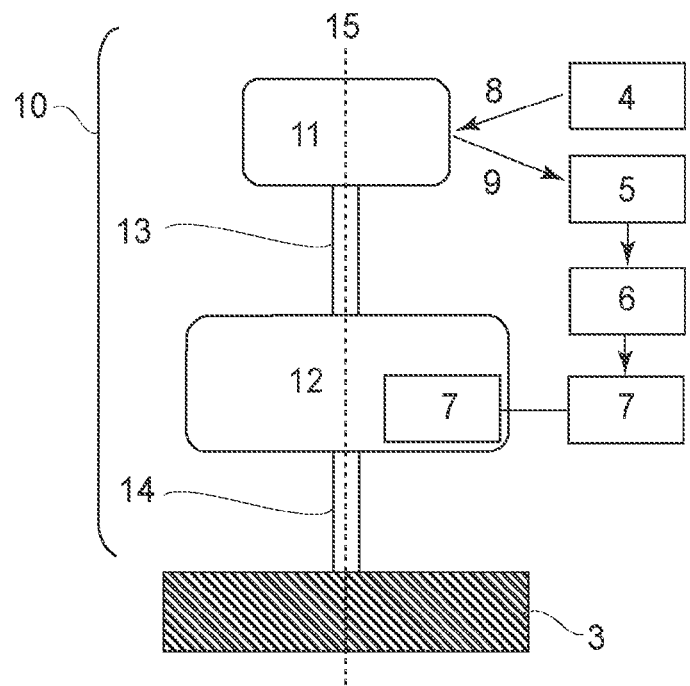

FIGS. 1A and 1B are block diagrams of an oscillator device of the present embodiment. First of all, the oscillator device shown in FIG. 1A will be explained. The oscillation system 10 of the oscillator device of FIG. 1A comprises an oscillator 1 and an elastic supporting member 2, and it is configured to provide resonance drive. The elastic supporting member 2 couples the oscillator 1 with a supporting member 3, to support the oscillator 1 torsional oscillation about an oscillation axis 15. The oscillation axis 15 is defined by a torsional axis of the elastic supporting member 2. The oscillation system 10 has a resonance frequency as determined by the inertia moment of the oscillator 1 and the spring constant of the elastic supporting member 2.

If an optical deflection device such as a reflection member formed on the surface of the oscillator, for example, the oscillator device can be used as an optical deflector. As regards the reflection member, a metal membrane such as aluminum may be formed by sputtering.

A light beam 8 emitted from a light source 4 is reflected by the reflection surface of the oscillator. A photodetector (beam detector BD) 5 supplies a timing signal for the reflected light 9 passing over the photodetector 5, to a control unit 6. Based on this timing signal, the control unit 6 generates a driving signal for driving the oscillator. Furthermore, the control unit 6 supplies this driving signal to a driving member 7. Then the driving member 7 applies a torque corresponding to this driving signal to the oscillator 1.

Figure 2A:
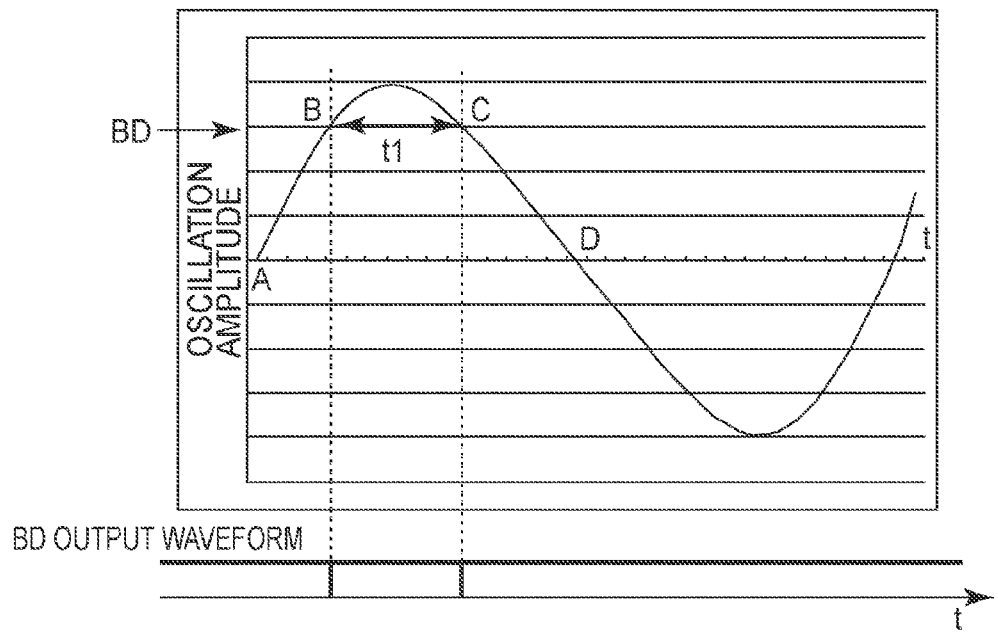
FIGS. 2A and 2B are graphs for explaining oscillation amplitude of an oscillator and BD output waveforms.

The oscillator device of FIG. 1A is able to operate to provide sinusoidal-wave oscillation amplitude with respect to time, as shown in FIG. 2A, for example. Furthermore, the timing signal for the reflected light 9 passing over the photodetector 5 may have a BD output waveform such as shown in FIG. 2A, for example. On the basis of the information regarding the time difference t1 which is obtainable from the timing signal at point B and the timing signal at point C, the control unit 6 detects the size of the oscillation amplitude. Then, the control unit 6 generates a driving signal based on Δt1 (Δt1=t1'−t1) which is the difference between the time difference t1 and a target time difference t1'.

The driving signal generated by the control unit 6 is a periodic function such as a sinusoidal wave, and it is such signal that the driving voltage with respect to time can be depicted by a sinusoidal wave. Alternatively, a signal called PWM signal obtainable by converting that signal into a pulse signal, may be used.

It should be noted that, although in this embodiment a photodetector 5 is used to detect the oscillation of the oscillator 1, the elastic supporting member 2 may be provided with a piezoresistor and an output signal of this piezoresistor may be applied to the control unit 6 as a timing signal.

In response to the driving signal, the driving member 7 supplies a driving force to the oscillation system 10 based on an electromagnetic method, an electrostatic method or a piezoelectric method. In the case of electromagnetic driving, a permanent magnet may be provided on the oscillator 1, for example, and an electric coil for applying a magnetic field to this permanent magnet may be disposed in the vicinity of the oscillator 1. Alternatively, the permanent magnet and the electric coil may be disposed reversely. In the case of electrostatic driving, an electrode may be formed on the oscillator 1, and an electrode for producing an electrostatic force acting between it and the other electrode may be formed in the vicinity of the oscillator 1. In the case of piezoelectric driving, a piezoelectric element may be provided on the oscillation system 10 or the supporting member 3 of the oscillation system 10, and a driving force may be applied thereby.

The control unit 6 reciprocally sweeps the driving frequency of the driving signal across the resonance frequency of the oscillation system, and determines the resonance frequency based on at least two frequencies with which the oscillation amplitude value obtainable by the reciprocal sweeping reaches a maximum. Then, the control unit 6 generates a driving signal based on the thus determined resonance frequency, and applies this driving signal to the driving member 7.

[Control Unit for Realizing 1st Resonance Frequency Measurement]

First of all, the control unit for realizing first resonance frequency measurement in this embodiment will be explained with reference to FIG. 4.

Figure 4:
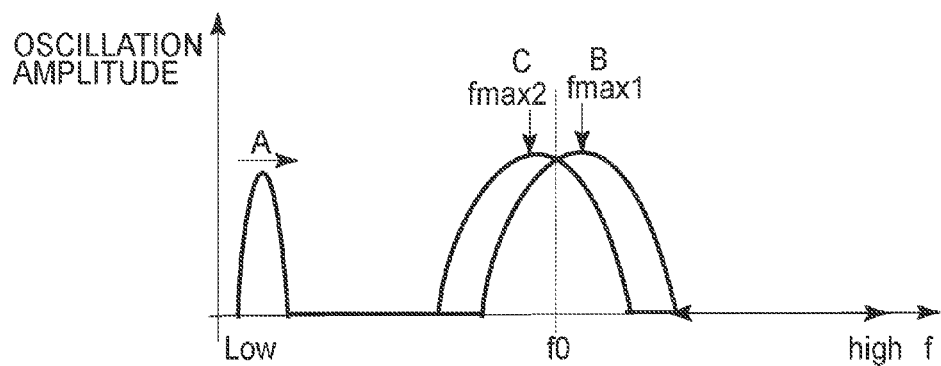
FIG. 4 is a graph for explaining a control unit realizing measurement of a first resonance frequency in the present invention.

FIG. 4 is a graph in which the driving frequency is taken on the axis of abscissas, while the value of oscillation amplitude is taken on the axis of ordinate. For measurement of the resonance frequency, the frequency of the driving signal is changed from the low frequency side to the high frequency side at a constant rate to ensure that the resonance frequency is included in the sweeping range, and the oscillation system 10 is driven based on it. The frequency (point B) whereat the oscillation amplitude value reaches a maximum as it is swept by the forward stroke is denoted by fmax1. Subsequently, the frequency of the driving signal is changed from the high frequency side to the low frequency side at a constant rate, and the oscillation system 10 is driven based on it. The frequency (point C) whereat the oscillation amplitude value reaches a maximum as it is swept by the backward stroke is denoted by fmax2. Then, a mean frequency (fmax1+fmax2)/2 of fmax1 and fmax2 obtained by the reciprocal sweeping is calculated, by which the resonance frequency of the oscillation system 10 can be determined. In this case, the sweeping speed of the forward stroke and the sweeping speed of the backward stroke are the same.

Although in this example the forward stroke of the reciprocal sweeping is made in the direction from the low frequency side to the high frequency side and the backward stroke is made in the direction from the high frequency side to the low frequency side, these may be reversed. Namely, the forward stroke may be made from the high frequency side to the low frequency side and the backward stroke may be made form the low frequency side to the high frequency side.

In order to assure that the resonance frequency is included in the sweeping range, the resonance frequency of the oscillation system may be predicted beforehand from the material or size of the oscillation system, for example, and the reciprocal sweeping may be made in the vicinity of this frequency. Alternatively, the relationship between the temperature and the resonance frequency of the oscillation system may be detected beforehand and, while predicting the resonance frequency of the oscillation system based on this, the reciprocal sweeping may be made in the vicinity of the thus predicted frequency.

Furthermore, if the oscillation system has a plurality of resonance frequencies like the oscillator device shown in FIG. 1B, the reciprocal sweeping may be made in the vicinity of each resonance frequency or, alternatively, reciprocal sweeping may be made in a sweeping range that includes these resonance frequencies.

The reason why fmax1 and fmax2 deviate from each other is that: since the Q-value of the oscillation system 10 is high, it takes a substantial time until the amplitude reaches a steady or stationary state after the driving with a certain driving frequency is started. If the change of frequency is made extremely slow, fmax1 and fmax2 will be almost the same. In that case, however, the measurement takes an extraordinarily long time. The amount of deviation from the resonance frequency is the same even if the frequency sweeping is made from the low frequency side to the high frequency side or it is made from the high frequency side to the low frequency side, provided that the frequency changing rate is the same. Thus, the mean frequency of fmax1 and fmax2 provides the resonance frequency of the oscillation system 10.

[Control Unit for Realizing 2nd Resonance Frequency Measurement]

Figure 5:
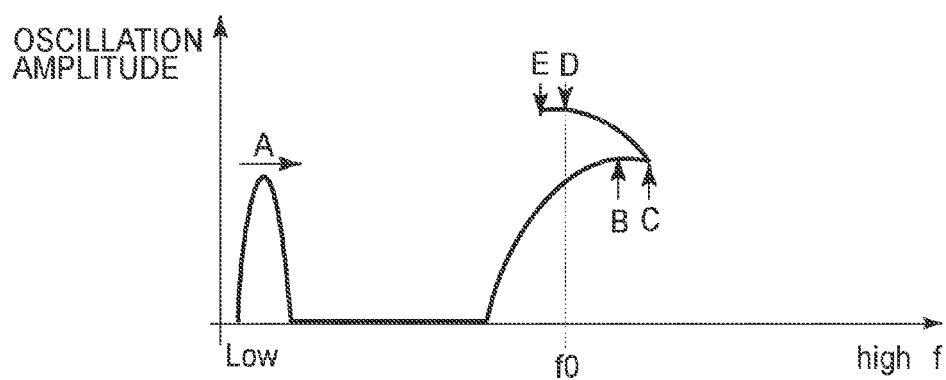
FIG. 5 is a graph for explaining a control unit realizing measurement of a second resonance frequency in the present invention.

Referring to FIG. 5, a control unit realizing second resonance frequency measurement in this embodiment will be explained.

FIG. 5 as well is a graph in which the driving frequency is taken on the axis of abscissas, while the value of oscillation amplitude is taken on the axis of ordinate.

After sweeping the driving frequency in the forward stroke direction, the control unit sweeps the driving frequency in the backward stroke direction at a speed slower than the sweeping speed of the forward stroke. Here, in sweeping the driving frequency, the control means may successively change the driving frequency by a predetermined variation. Also, after each variation is applied, the control means may hold the same driving frequency for a predetermined time.

Referring to FIG. 5, first of all, the control unit sweeps the driving frequency in the forward stroke direction. Then, at a position (point C) whereat the oscillation value starts to decrease after the frequency (point B) whereat the oscillation amplitude value reaches a maximum is passed over, the control means stops the driving-frequency sweeping. Subsequently, in the backward stroke direction from the position whereat the forward stroke sweeping was stopped, the control means sweeps the driving frequency at a speed slower than the forward-stroke sweeping speed. The frequency (point D) whereat the oscillation amplitude again reaches a maximum is taken as the resonance frequency of the oscillation system. The fact that point D provides the resonance frequency can be detected when, after passing over the point D (local maxima), the point E where the oscillation amplitude decreases is reached.

Here, the speed which is slower than the sweeping speed in the forward stroke direction may be the speed by which the driving frequency at point D (local maxima) and the practical resonance frequency of the oscillation system 10 approximately coincide with each other.

More specifically, if the sweeping speed in the backward stroke direction is too fast, the driving frequency changes before the oscillation system 10 reaches the stationary state. Hence, the driving frequency at point D (local maxima) and the practical resonance frequency of the oscillation system 10 deviate from each other. In order to sweep the frequency at a speed slower than the forward stroke sweeping speed, as an example, a longer time may be taken for the measurement of the oscillation amplitude per each frequency (each step).

This method enables measurement of the resonance frequency in a shorter time, as compared with the control unit for realizing the first resonance frequency measurement described hereinbefore.

[Control Unit for Realizing 3rd Resonance Frequency Measurement]

Figure 6:
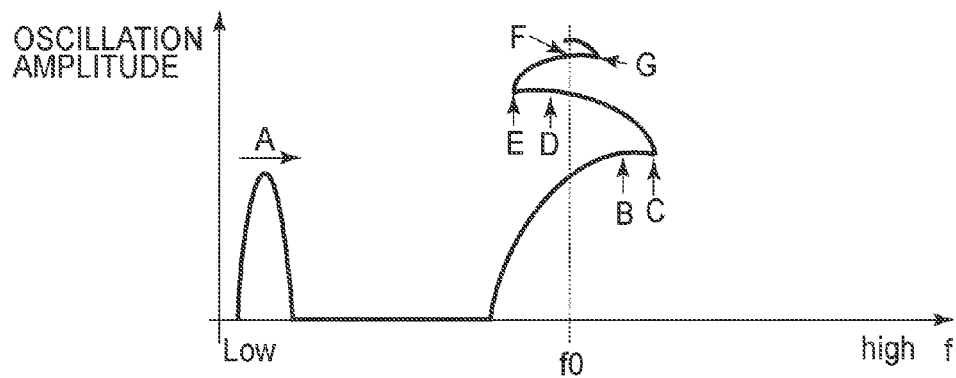
FIG. 6 is a graph for explaining a control unit realizing measurement of a third resonance frequency in the present invention.
Figure 8:
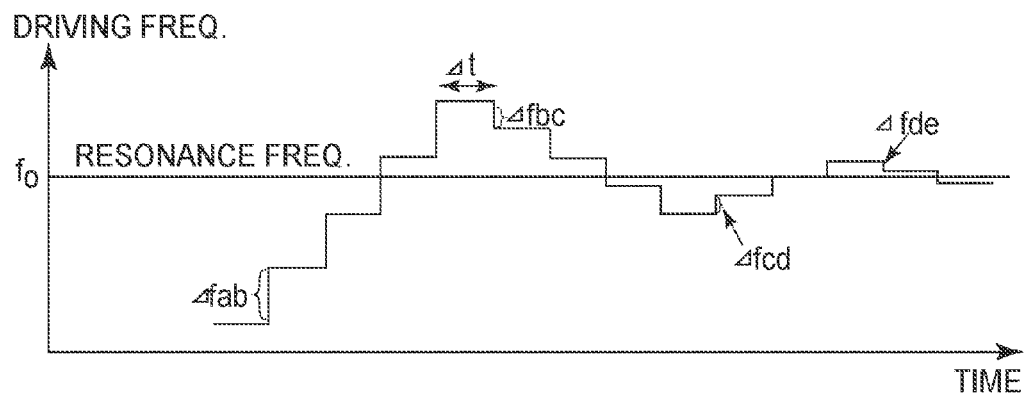
FIG. 8 is a diagram for explaining an oscillator device according to the third working example of the present invention.

Referring to FIGS. 6 and 8, a control unit realizing third resonance frequency measurement in this embodiment will be explained. FIG. 6 as well is a graph in which the driving frequency is taken on the axis of abscissas, while the value of oscillation amplitude is taken on the axis of ordinate. Also, the axis of abscissas of FIG. 8 depicts time, and the axis of ordinate depicts the driving frequency.

As shown in FIG. 6, first of all, the control unit sweeps the driving frequency in the forward stroke direction. Then, at a position (point C) where the oscillation amplitude starts to decrease after the frequency (point B) whereat the oscillation amplitude reaches a maximum is passed over, the control unit stops the sweeping of the driving frequency. Here, in the forward stroke sweeping, the driving frequency is sequentially increased by Δfab at every single step as shown in FIG. 8. Furthermore, at each step, the driving frequency is held for time Δt.

Subsequently, from the position (point C) where the sweeping was stopped, the backward-stroke sweeping is initiated. The step width of sweeping at this time is Δfbc as shown in FIG. 8 which is made narrower than the step width Δfab in the forward direction. Then, at a position (point E) where the oscillation amplitude starts to decrease after the frequency (point D) whereat the oscillation amplitude reaches a maximum is passed over, the control unit stops the sweeping of the driving frequency.

Furthermore, from the position (point E) where the sweeping was stopped, the forward stroke sweeping is started. The step width of sweeping at this time is Δfbd as shown in FIG. 8 which is made narrower than the step width Δfac. Then, at a position (point G) where the oscillation amplitude starts to decrease after the frequency (point F) whereat the oscillation amplitude reaches a maximum is passed over, the control unit stops the sweeping of the driving frequency.

Subsequently, from the position (point G) where the sweeping was stopped, the backward stroke sweeping is initiated. The step width of sweeping at this time is Δfbe as shown in FIG. 8 which is made narrower than the preceding step width Δfad.

Figure 9:
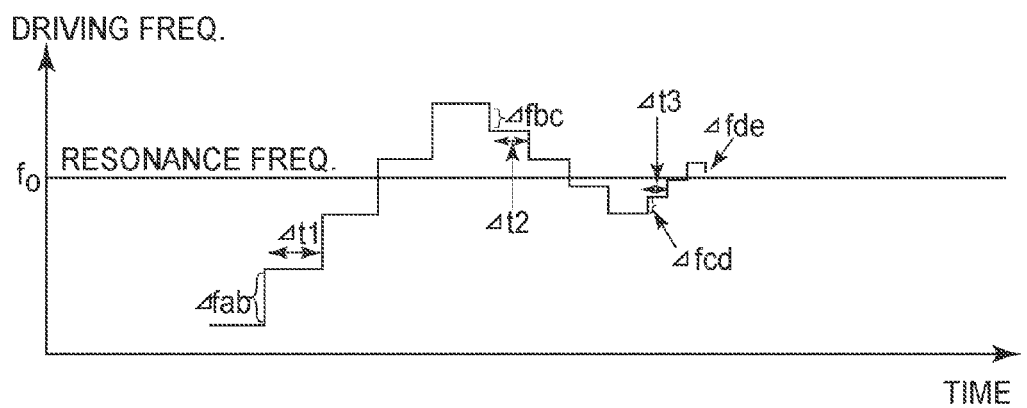
FIG. 9 is a diagram for explaining an oscillator device according to the third working example of the present invention.

The reciprocal sweeping such as described above is repeated at least once, and the driving frequency as the amount of variation per each step becomes smaller than a predetermined value may be taken as the resonance frequency. Furthermore, the time for holding the driving frequency at each step may be made variable like Δt2, Δt2 and Δt3 as shown in FIG. 9, for example.

[Other Forms of Oscillator Device]

The control unit for realizing resonance frequency measurement as described hereinbefore can be applied to an oscillator device shown in FIG. 1B.

FIG. 1B illustrates an oscillator device according to another embodiment of the present embodiment. The oscillation system 10 of this oscillator device includes a first oscillator 11, a second oscillator 12 and a supporting member 3. The first oscillator 11 is supported by the first elastic supporting member 13 for torsional oscillation about an oscillation axis 15, relative to the second oscillator 12. The second oscillator 12 is supported by the second elastic supporting member 14 for torsional oscillation about the oscillation axis 15 relative to the supporting member 3. The oscillation axis 15 is defined by the torsional axis of the elastic supporting members 13 and 14. Furthermore, in this case as well, an optical deflecting element such as a reflection member may be formed on the surface of the first oscillator, for example, and then the oscillator device can be used as an optical deflector. As regards the reflection member, a metal membrane such as aluminum may be formed by sputtering, fore example.

In the case of oscillator device of FIG. 1B, the oscillation system 10 will have a first natural oscillation mode and a second natural oscillation mode having different frequencies, around the oscillation axis 15.

The relationship between time t and displacement angle θ of the oscillator device of FIG. 1B can be depicted as Equation (1) below.

$$\theta(t) = A_1 \sin \omega t + sA_2 \sin(n\omega t + \phi) \quad (1)$$

where $A_1$ and $\omega$ are the amplitude and angular frequency of the first vibrational motion ($A_1 \sin \omega t$), respectively, and $A_2$ and $n\omega$ are the amplitude and angular frequency of the second vibrational motion ($A_2 \sin(n\omega t + \phi)$), respectively. Furthermore, $\phi$ is the relative phase difference between the first and second vibrational motions, and n is an integer number not less than 2.

When the resonance frequency of the first natural oscillation mode is denoted by f1 and the resonance frequency of the second natural oscillation mode is denoted by f2, the oscillation system 10 is so made that the resonance frequency f1 and resonance frequency f2 are placed approximately in a relationship of 1:n (n is an integer not less than 2). Here, the approximately in 1:n relationship of f1 and f2 specifically refers to the relationship of $0.98n \leq f2/f1 \leq 1.02n$. If for example n=2, the driving waveform of Equation (1) has a sawtooth-wave shape (see Japanese Laid-Open Patent Application No. 2005-208578). If n=3, the driving waveform of Equation (1) has a chopping wave shape (see U.S. Pat. No. 4,859,846).

The driving signal for driving the oscillator device in accordance with above formula (1) can be expressed by Equation (2) below, for example.

$$D(t) = B_1 \sin \omega t + B_2 \sin(n\omega t + \psi) \quad (2)$$

where $B_1$ and $B_2$ are amplitude components of the driving signal and, here, it is a driving voltage, for example. Furthermore, $\psi$ is the relative phase difference of the first driving signal ($B_1 \sin \omega t$) and the second driving signal ($B_2 \sin(n\omega t + \psi)$).

Furthermore, the driving signal depicted by above formulas (2) may be converted into a signal called a PWM (Pulse Width Modulation) signal which comprises a large number of pulse trains, and this may be used as the driving signal. If such PWM signal is used, the oscillator device can be drive-controlled by changing the number, spacing or width of the pulses with respect to time.

Figure 2B:
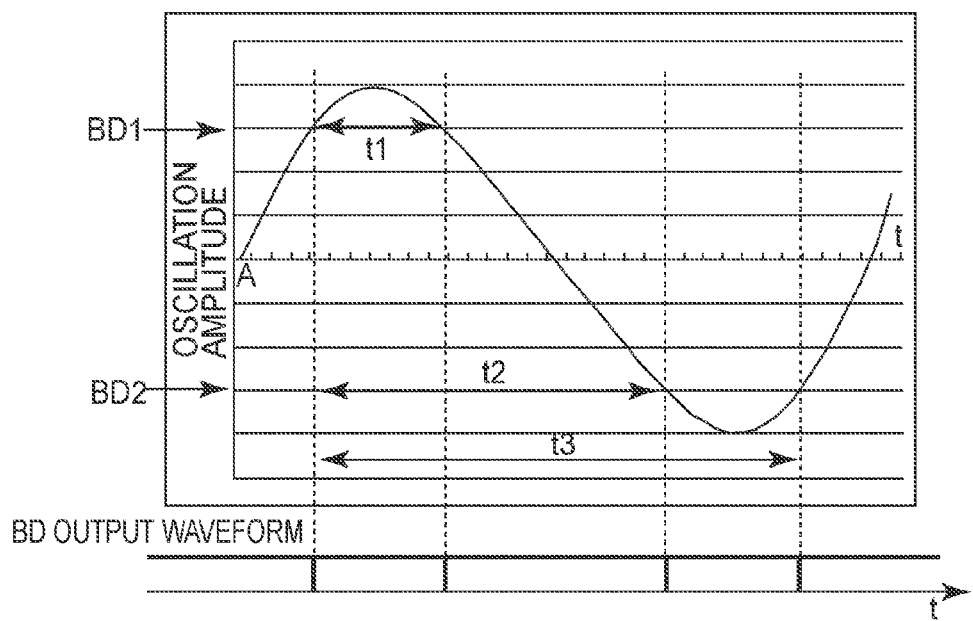

Furthermore, when the oscillator device of FIG. 1B is drive-controlled, two photodetectors 5 may be used. The two photodetectors may be disposed at positions BD1 and BD2 shown in FIG. 2B, so that four BD outputs are obtainable during one period. The control unit 6 may control the oscillator device based on times t1, t2 and t3 of FIG. 2B, for example.

With regard to the measurement of the resonance frequency of the oscillator device of FIG. 1B, it may be measured in a similar manner as the oscillator device shown in FIG. 1A.

Next, several working examples of the present invention will be described.

Working Example 1

Figure 3:
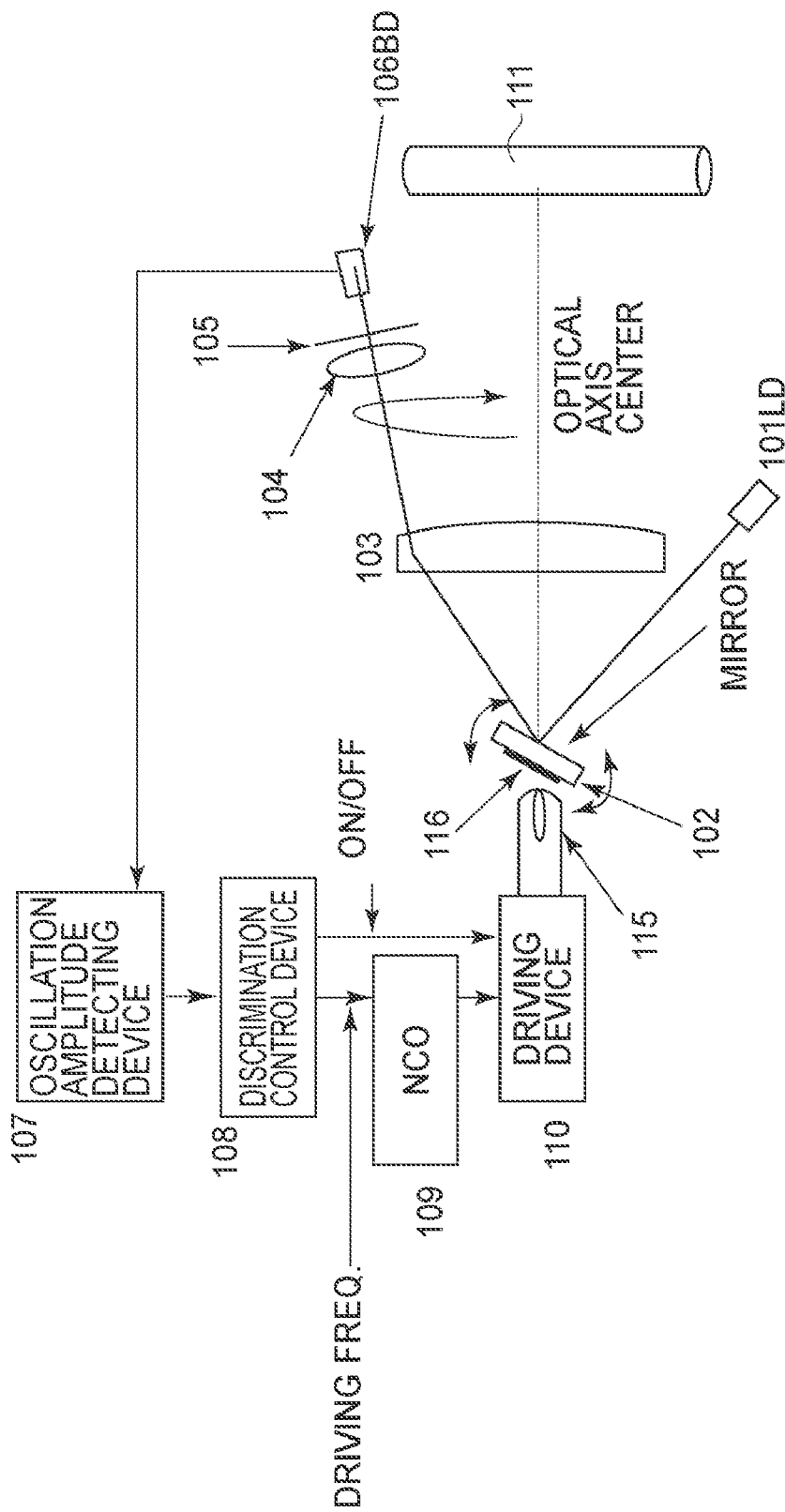
FIG. 3 is a block diagram illustrating a structural example of a case wherein the present invention is applied to a scanner unit of a laser beam printer (LBP), the case corresponding to first and second working examples to be described later.

FIG. 3 is a block diagram illustrating a structural example of working example 1, wherein the present invention is applied to a scanner unit of a laser beam printer (LBP). In this example, the oscillator device shown in FIG. 1A is used.

The example will be explained with reference to FIGS. 2, 3 and 4. In the structure of FIG. 3, the light coming from a laser diode (LD) 101 is reflected by a mirror formed on an oscillator 102, and passes through an fθ lens 103, a condenser lens 104 and a slit 105 at the timing as the oscillator 102 passes over the vicinity of the end portion of the oscillation range. Then, the light is incident on a beam detector (BD) 106. A BD signal responsive to the input light incident on the BD 106 is supplied to an oscillation amplitude detecting device 107 by which amplitude information is produced. The oscillator scans the light beam from the light source, and the optical system collect the scanning light at a target position on the photosensitive member. Namely, at the timing whereat the oscillator 102 oscillates around the center of the oscillation range, the light from LD 101 is incident at the target position on the photosensitive member 111 after passing through the fθ lens which converts equiangular scan to constant-speed scan, whereby a latent image is formed on the photosensitive member.

The amplitude information detected by the oscillation amplitude detecting device 107 is inputted to a judgment control unit 108. While comparing with the preceding amplitude measurement information obtained by the oscillation amplitude detecting means 107, the judgment control unit 108 performs the following control based on the comparison result. That is, it controls the setting of the driving frequency based on an NCO (Numerical Control Oscillator) 109 and, additionally, controls ON/OFF operation of the driving member 110. The driving member 110 then produces a driving signal of a driving frequency having been set in the NCO 109 under the control of the judgment control unit 108. This driving signal drives a driving coil 115 provided adjacent the oscillator 112 and applies a magnetic force to a magnet 116 mounted on the oscillator 102, by which the oscillator 102 having a mirror is oscillated. The oscillator 12 is connected to a stationary portion (not shown) by means of a torsion spring, for oscillating motion.

Here, the BD 106 and the oscillation amplitude detecting means 107 constitute the detecting means for detecting the oscillation amplitude of the oscillator 102. Furthermore, the driving member 110, driving coil 115 and magnet 116 constitute a driving mechanism for driving the oscillator 102 in response to the driving signal. In addition, the judgment control unit 108 and the NCO 109 constitute a control unit for controlling the frequency of the driving signal and the driving operation of the driving mechanism.

Referring to FIG. 2, the oscillation amplitude will be explained in greater detail. FIG. 2A illustrates the relationship between the DB output signal and the scanning position of the light beam coming back again to the optical-axis center side after being scanned from the optical-axis center side to the BD 106 side due to the oscillation of oscillator 102. The light beam shifts from the optical axis center at point A while crossing the position of the BD 106 at point B during the measurement starting period and, after passing outside the BD 106, it goes through the position of the BD 106 at point C during the measurement closing period. The light then comes back to the optical-axis center at point D. At positions of point B and point C, the laser beam is incident on the BD 106, and an output such as illustrated at the BD output waveform is produced from the BD 106. Thus, the value of t1 corresponding to the interval between the measurement starting period and the measurement closing period represents the oscillation amplitude of the oscillator 102. In this working example, based on the change of this value of t1, the judgment control unit 108 discriminates the change or hysteresis of the oscillation amplitude of the oscillator 102 relative to the frequency of the driving signal set by the NCO 109 and, based on the result of judgment, it controls the frequency and the driving operation of the driving signal of driving member 110. Furthermore, the judgment control unit 108 has a function for performing the reciprocal sweep of the frequency of the driving signal at least at least once, in the neighborhood of the resonance frequency of oscillator 102, and determines the information of the resonance frequency of the oscillator 102 based on the value of the frequency of the driving signal whereat the oscillation amplitude takes a maximum value.

The operation of this working example will be explained.

First of all, the aforementioned control unit controls the operation of the driving mechanism to drive the oscillator 102 in accordance with the "Low" frequency (first driving frequency) at the left-hand side end of FIG. 4. Since the waveform at the start of driving has a shape produced by integrating a sinusoidal wave and a stepping wave, it has a certain extent resulting from combination of the sinusoidal wave frequency and the Fourier transform of the stepping wave. Thus, the oscillator 102 resonates. This is illustrated at a portion A.

Since it is not the resonance frequency of the oscillator 102 to be exactly produced, the amplitude should not be measured for a predetermined time period until the amplitude is stabilized to the steady state, by which erroneous detection of the resonance frequency can be avoided. If the Q-value is around 800 and the resonance frequency of the oscillator 102 is 2 KHz, the frequency will be stabilized to a sufficiently steady state in about 0.5 second. In FIG. 4, since the axis of abscissas depicts the frequency, the frequency is changed until it is stabilized to the stationary state. The frequency sweeping should preferably be interrupted in this period.

Subsequently, after elapse of a predetermined time, the judgment control unit 108 controls the driving member 110 through the NCO 109 to gradually raise the driving frequency from Low to High, digitally or continuously. Then, the judgment control unit 108 is able to detect passage of the oscillation amplitude of the oscillator 102 following the locus of B in FIG. 4, this being made on the basis of processing the detection result of the oscillation amplitude detecting means 107. The frequency with which the oscillation amplitude value reaches a maximum at this time is taken as fmax1. Furthermore, as the driving frequency reaches the "High" frequency (second driving frequency) and it is gradually lowered in the direction of "Low", the judgment control unit 108 is able to detect passage of the oscillation amplitude of the oscillator 102 following the locus of C, this being made on the basis of the detection result of the oscillation amplitude detecting means 107. The frequency with which the oscillation amplitude value reaches a maximum at this time is taken as fmax2. Such operation is repeated once or more.

The reason why fmax1 and fmax2 deviate from each other is that: since the Q-value of the oscillation system 102 is high, it takes a substantial time until the amplitude reaches a steady or stationary state after the driving with a certain driving frequency is started. If the change of frequency is made extremely slow, fmax1 and fmax2 will be almost the same. In that case, however, the measurement takes an extraordinarily long time. The amount of deviation from the resonance frequency f0 is the same even if the frequency sweeping is made from the low frequency side to the high frequency side or it is made from the high frequency side to the low frequency side, provided that the frequency changing rate is the same. Thus, the mean frequency of fmax1 and fmax2 provides the resonance frequency of the oscillation system 102. If the above-described operation is going to be repeated twice or more to obtain the mean frequency, these mean values may be calculated to determine the resonance frequency. In this way, the judgment control unit 108 operates the mean frequency of the frequency fmax1 and the frequency fmax2, and controls the driving member 110 through the NCO 109 so as to drive the oscillator 102 with this mean frequency. By this, the oscillator 102 can be resonance-driven efficiently.

The sweeping speed for the frequency from "Low" to "High" and the sweeping speed for the frequency from "High" to "Low" may be made different from each other. In such case, however, generally, deviations of fmax1 and fmax2 from the resonance frequency f0 will have different values. Therefore, in such case, the judgment control unit 108 should compute fmax1 and fmax2 by use of a suitable computing equation (this being determined beforehand) according to the difference of the sweeping speed to obtain the resonance frequency f0. Furthermore, if the resonance frequency f0 is obtained by the judgment control unit 108, the judgment control unit 108 may control the driving mechanism so as to drive the oscillator 102 with a driving frequency intentionally shifted off the resonance frequency f0.

In the structure described above, a piezoresistor may be used as the oscillation amplitude detecting means. If the displacement angle of the oscillator, namely, the oscillation magnitude, is going to be detected by using a piezoresistor, the piezoresistor may be provided on the torsion spring, for example, which supports the oscillator 102 for oscillating motion, and the displacement angle (oscillation amplitude) of the oscillator may be detected based on a signal outputted from this piezoresistor. The piezoresistor can be made by diffusing phosphor in p-type monocrystal silicon, for example. The piezoresistor produces a signal in accordance with the torsion angle of the torsion spring. Thus, to measure the displacement angle of the oscillator, the piezoresistor may be provided at a plurality of torsion springs so that the displacement angle of the oscillator can be detected based on the information of the torsion angle from the plurality of torsion springs. This enables precise measurement.

Furthermore, with regard to the driving mechanism, in addition to the aforementioned electromagnetic system wherein a magnet 116 is mounted on the oscillator 102 and an electric coil 115 is mounted on a stationary side opposed thereto, any other electromagnetic system, an electrostatic system using an electrostatic force, a piezoelectric system using the piezo-electricity may be used as well. In such other electromagnetic system, a driving coil may be mounted on the oscillator 102, and a magnet may be mounted on a stationary side opposed thereto. In the electrostatic method, electrodes may be mounted on the oscillator 102 and a stationary side opposed thereto, and a driving signal may be applied to these electrodes to drive the oscillator 102. In the piezoelectric method, a piezoelectric element may be mounted on a stationary portion which supports the oscillator 102 for oscillating motion through s torsion spring, and a driving signal may be applied to the piezoelectric element to cause oscillation by which the oscillator 102 is driven. Here, the driving signal may be a sinusoidal signal having a suitable driving frequency or a periodic signal such as a pulse signal.

Working Example 2

Working Example 2 of the present invention will be explained. The basic structure of the oscillator device of the second working example is the same as that shown in FIG. 3. The first working example uses a relative simple structure in which the driving frequency is changed from Low into High and subsequently it is changed from High to Low, to measure the amplitude change by use of BD signals. Practically, however, there is a possibility that, if the oscillator 102 is driven in an atmosphere, jitter is raised due to the air resistance to cause an error in the values of fmax1 and fmax2 which should be an amplitude maximum. To reduce this error, each driving frequency should be multiplied by time to measure the oscillation amplitude and to average the measured amplitudes.

In consideration of this, in the second working example, the control through the judgment control unit 108 and the NCO 109 is made as follows. The driving starts with the frequency which is shown at A in the Low part of FIG. 5, and this is the same as the first working example.

In the forward stroke, when the driving frequency is brought close to "High" side, like the first working example, it is recognizable that the peak was at point C when the oscillation amplitude begins to decrease at B. Thus, the frequency sweeping is stopped there. As has been described with reference to the first working example, the peak B deviates to the High side from the resonance frequency f0 of the oscillator 102. In consideration of this, subsequently in the backward stroke, the driving frequency is turned back to the Low side along a locus shown by a thick line, while changing the driving frequency. For this turning back, a longer time is taken for the measurement of the oscillation amplitude with respect to every frequency, as compared with the frequency sweep by the forward stroke. More specifically, if it is swept digitally, at every driving frequency, the oscillator 102 may be driven for about 0.4 second and, after the amplitude is stabilized into the steady state, the amplitude information of the oscillator 102 may be accumulated for about 0.2 second to reduce the influence of the jitter due to the air resistance. Then, averaging of the accumulated amplitude information is repeated. With this procedure, it can be recognized by the judgment control unit 108 and at point E that the maximum was at D. In this manner, it is detected that the resonance frequency of the oscillator 102 is at the value of D one frequency-increment ago.

In accordance with the method of this working example, as compared with the first working example wherein the driving frequency is reciprocally swept from Low to High and from High to Low, the driving frequency can reach around the resonance frequency in a shorter time. Furthermore, after detecting an approximate resonance frequency by a method of the first working example, the frequency range around the resonance frequency may be searched while using time as in the second working example, to detect the amplitude maximum value and measure the resonance frequency f0 more accurately. The remaining points are similar to the first working example.

Working Example 3

Figure 7:
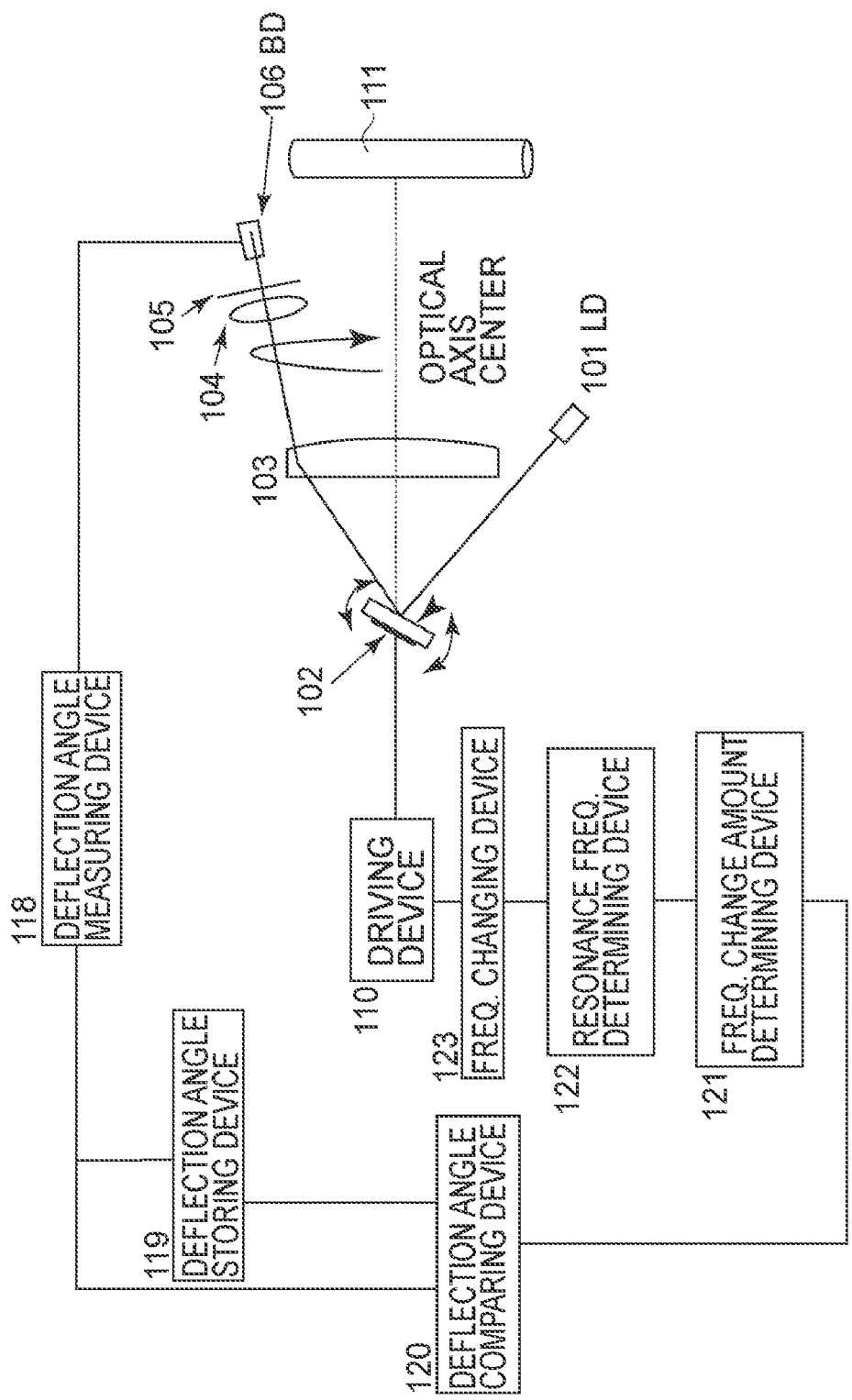
FIG. 7 is a block diagram illustrating a structural example of a case wherein the present invention is applied to a scanner unit of a laser beam printer (LBP), the case corresponding to third and fourth working examples to be described later.

Working example 3 of the present invention will be explained. FIG. 7 is a block diagram which shows a structural example of the third working example, when the oscillator device of the present invention is applied to a scanner unit of the LBP. In the example, the oscillator device shown in FIG. 1A is used.

In FIG. 7, a certain initial value f1 having a certain driving frequency is set in the driving member 110 and the oscillator 102 is reciprocally oscillated. Here, the laser beam emitted from a laser diode (LD) 101 is reflected by the oscillator 102. At the timing whereat this reflected light passes adjacent the end portion of the scanning range, the reflected light goes through an fθ lens 103, a condenser lens 104 and a slit 105, and is incident ton a beam detector (BD) 106. In accordance with this timing of incidence, the deflection angle measuring device 118 obtains the deflection angle information of the oscillator 102. Here, since certain time is necessary for the oscillator 102 until the deflection angle change is stabilized into a steady state, latency time Δt is given after the driving frequency is set in the driving member 110 and till the deflection angle is measured through the deflection angle measuring device 118. Afterwards, the deflection angle information α is stored into a deflection angle memory 119.

Subsequently, a predetermined frequency variation amount Δf is added to the initial value f1, and the oscillator 102 is driven by f2 (f2=f1+Δf). In this case as well, a latency time Δt is given till the deflection angle change is stabilized into a steady state. Afterwards, the deflection angle is measured by the deflection angle measuring means 118, and the deflection angle information β is obtained. Then, the thus obtained deflection angle information β is compared with the previously obtained deflection angle information α at the deflection angle comparing member 120, the increase/decrease of the deflection angle of the oscillator 102 is discriminated. The comparison result with this deflection angle comparing member 120 is applied to a frequency variation determining device 121.

Subsequently, the frequency variation determining device 121 determines the frequency variation Δf in accordance with the comparison result made at the deflection angle comparing member 120, that is, the increase or decrease of the deflection angle of the oscillator 102. More specifically, if the deflection angle of the oscillator 102 has increased by changing the driving frequency from f1 to f2, the frequency variation should be sets to a positive value. If on the other hand the deflection angle of the oscillator 102 has decreased, since it means that the driving frequency is set to a frequency larger than the resonance frequency, the frequency variation should be set to a negative value. The value of the frequency variation as determined by the frequency variation determining device 121 is supplied to a resonance frequency determining device 122.

The resonance frequency determining device 122 compares the frequency variation Δf with a certain predetermined value X and, if the frequency variation Δf is larger than the value X, a value f3 (=f2+Δf) obtainable by adding Δf to the current driving frequency f2 is set as the driving frequency. On the other hand, if the frequency variation Δf is smaller than the value X, the driving frequency f2 at that moment is determined as the resonance frequency f0 of the oscillator 102. Namely, as the driving frequency nears the resonance frequency, the absolute value of the frequency variation Δf becomes smaller and it converges to zero. Then, the driving frequency when this Δf becomes smaller than the value X is taken as the resonance frequency.

If Δf becomes larger than the predetermined value X, the driving frequency is renewed to f3 by the frequency changing member 123, and the oscillator 102 is reciprocally oscillated by the driving member 110 based on the driving frequency f3. Then, a series of operations described above are carried out repeatedly.

This will be described in greater detail with reference to FIGS. 6 and 8.

FIG. 6 is a graph in which the driving frequency is taken on the axis of abscissas, while the value of oscillation amplitude is taken on the axis of ordinate. Also, the axis of abscissas of FIG. 8 depicts time, and the axis of ordinate depicts the driving frequency.

As shown in FIG. 6, first of all, the oscillator 102 is swept in the direction (forward stroke direction) in which the driving frequency increases. Then, at the position (point C) where the oscillation amplitude starts to decrease after the frequency (point B) whereat the oscillation amplitude reaches a maximum is passed over, the sweeping of the driving frequency is stopped. Here, in the forward stroke sweeping, the driving frequency is sequentially increased by Δfab at every single step as shown in FIG. 8. Furthermore, at each step, the driving frequency is held for time Δt. In this case, the frequency variation to be determined by the frequency variation determining means 121 is Δfab.

Subsequently, from the position (point C) where the sweeping was stopped, the sweeping in the direction (backward-stroke direction) in which the driving frequency decreases is initiated. The step width of sweeping at this time is Δfbc as shown in FIG. 8 which is made narrower than the step width Δfab in the forward direction. In this case, the frequency variation to be determined by the frequency variation determining means 121 is Δfbc.

Then, at a position (point E) where the oscillation amplitude starts to decrease after the frequency (point D) whereat the oscillation amplitude reaches a maximum is passed over, the sweeping of the driving frequency is stopped. Furthermore, from the position (point E) where the sweeping was stopped, the forward stroke sweeping is started. The step width of sweeping at this time is Δfcd as shown in FIG. 8 which is made narrower than the step width Δfbc. In this case, the frequency variation to be determined by the frequency variation determining means 121 is Δfcd. Then, at a position (point G) where the oscillation amplitude starts to decrease after the frequency (point F) whereat the oscillation amplitude reaches a maximum is passed over, the sweeping of the driving frequency is stopped.

Subsequently, from the position (point G) where the sweeping was stopped, the backward stroke sweeping is initiated. The step width of sweeping at this time is Δfde as shown in FIG. 8 which is made narrower than the preceding step width Δfcd. The frequency variation to be determined by the frequency variation determining means 121 is Δfde.

Such reciprocal sweep is repeated, and the driving frequency as the variation per one step becomes smaller than a predetermined value is taken as the resonance frequency. More specifically, by making the frequency variation Δf changeable and by changing Δf in the order of Δfab, Δfbc, Δfcd, Δfde . . . , the driving frequency can be converged to the resonance frequency which the oscillator 102 bears.

Although in this example the retention time for holding the driving frequency at each step is Δt, the time Δt may be made variable.

Generally, if the variation of the driving frequency is large, it takes a substantial time until the deflection angle of the oscillator 102 is stabilized into the steady state. Thus, with regard to Δf, if the frequency variation Δf=Δfm, there may be Δt=Δt1, and if the frequency variation Δf=Δfn, there may be Δt=Δt2, such that the latency time Δt may be changed in accordance with the frequency variation Δt (Δfm<Δfn and Δt1<Δt2).

As shown in FIG. 9, if the retention time at the frequency variations Δfab, Δfbc, Δfcd and Δfde, respectively, is denoted by Δt1, Δt3, Δt3 and Δt4, respectively, the retention time when Δfab>Δfbc>Δfcd>Δfde may be in the relationship of Δt1>Δt2>Δt3>Δt4.

This prevents the retention time applied when the driving frequency is being changed from becoming superabundant, and unnecessary measuring time can be removed or shortened.

Working Example 4

Working example 4 of the present invention will be explained. FIG. 7 is a block diagram which shows a structural example when the oscillator device of the present invention is applied to a scanner unit of the LBP. This working example as well uses the oscillator device shown in FIG. 1A. The oscillator device of the fourth working example has a structure basically similar to that of the third working example. Hereinafter, the distinctive features over the third working example will be explained.

In the third working example, the initial frequency variation Δfab is set and the frequency is changed by this frequency variation (Δfab) until the oscillation amplitude of the oscillator reduces, passing through the resonance frequency f0. In other words, the driving frequency is changed at a constant rate until the oscillation amplitude of the oscillator decreases while passing through the resonance frequency f0.

If, however, the initial value f1 of the driving frequency is set at a value largely different from the resonance frequency of the oscillator, the measurement of the resonance frequency would take very long time unless the frequency variation (Δfab) is changed. In consideration of this, in this working example, if the oscillator is driven at a driving frequency largely deviated from the resonance frequency f0, the value of the frequency variation of the driving frequency is enlarged. If the oscillator is driven at a driving frequency adjacent the resonance frequency f0, the value of the frequency variation of the driving frequency is lowered. With this procedure, the resonance frequency of the oscillator can be measured quickly.

Figure 10:
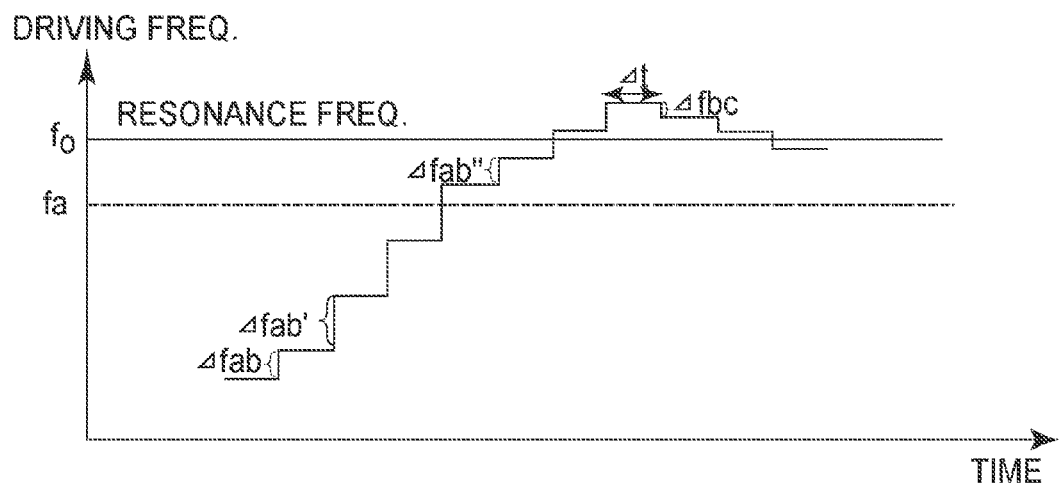
FIG. 10 is a diagram for explaining an oscillator device according to the fourth working example of the present invention.
Figure 11:
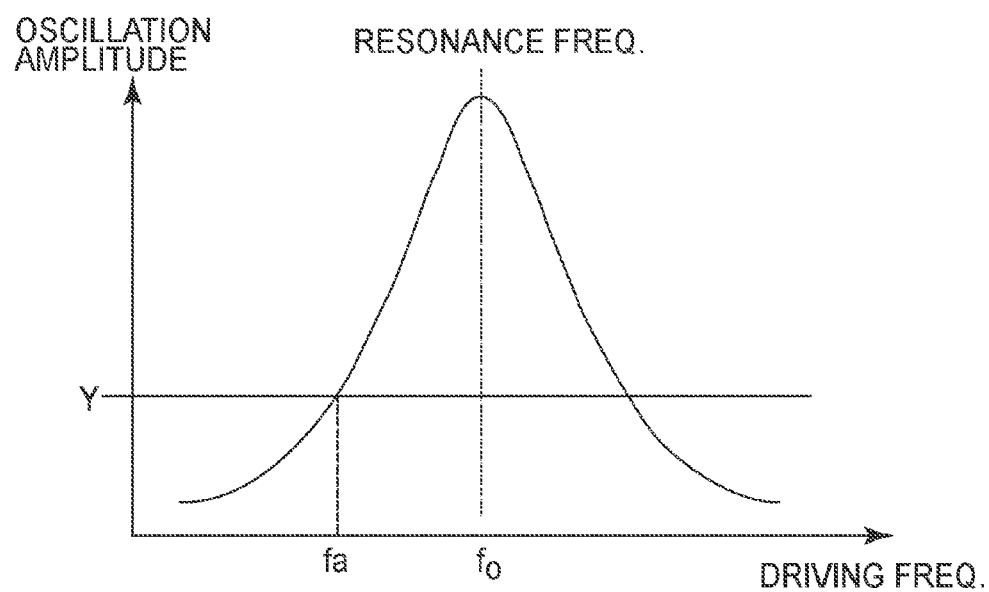
FIG. 11 is a diagram for explaining an oscillator device according to the fourth working example of the present invention.

Referring to FIGS. 10 and 11, this will be explained in greater detail. The axis of abscissas in FIG. 10 depicts time, and the axis of ordinate depicts the driving frequency. The axis of abscissas of FIG. 11 depicts the driving frequency, and the axis of ordinate depicts the oscillation amplitude.

In FIG. 7, an initial value f1 of a certain driving frequency is set in the driving member 110, and the oscillator 102 is reciprocally oscillated. Thereafter, it is driven at a driving frequency f2 (f2=f1+Δfab) obtainable by adding Δfab to the initial value f1. The deflection angle information θ of the oscillator when it is driven at the driving frequency f2 is memorized into a deflection angle memory 119. On the other hand, in this working example, as shown in FIG. 11, a certain oscillation amplitude (threshold amplitude) Y has been set beforehand. This threshold amplitude Y is being set in a threshold member (not shown), and it is compared with the deflection angle information θ of the oscillator memorized in the deflection angle memory 119, at the deflection angle comparing member 120.

If the deflection angle information θ is smaller than the threshold amplitude Y ($|\theta|<|Y|$), the information representing that the current oscillation amplitude is not exceeding the threshold amplitude Y is stored into the deflection angle memory 119 in the form of a judgment value j=0. On the contrary, if the deflection angle information θ is larger than or equal to the threshold amplitude Y ($|\theta|\geq|Y|$), the information representing that the current oscillation amplitude is exceeding the threshold amplitude Y is stored into the deflection angle memory 119 as a judgment value j=1. If the judgment value is j=1, since the driving frequency is closer to the resonance frequency f0 than to the driving frequency fa corresponding to the threshold amplitude Y, the frequency variation Δfab is kept unchanged.

If the judgment value is j=0, the following driving operation is carried out.

A threshold is set with regard to the variation (amplitude variation) of the oscillation amplitude per unit time, and the threshold here is denoted by Z (amplitude variation threshold). Furthermore, the amount of variation of the actual oscillation amplitude as the driving frequency is changed is denoted by Δθ. Then, if $|Z|<|\Delta\theta|$, since the variation of oscillation amplitude is larger than the amplitude variation threshold Z, the frequency variation Δfab is kept unchanged.

On the contrary, when the amplitude variation threshold Z and Δθ are compared with each other and if $|Z|\geq|\Delta\theta|$, the frequency variation Δfab is set to Δfab' (Δfab>Δfab'). Namely, in this case, the variation of the oscillation amplitude is not greater than the amplitude variation threshold Z and the variation of the oscillation amplitude is short. Thus, the frequency variation is increased. Thereafter, when the oscillation amplitude of the oscillator becomes larger than the threshold amplitude Y ($|\theta|\geq|Y|$), the frequency variation of the driving frequency is changed from Δfab' to Δfab" (Δfab'>Δfab").

The remaining portions are similar to the third working example.

In summary, in this working example, the variation of the driving frequency when the oscillation amplitude of the oscillator is smaller than the predetermined threshold is made at a value larger than the variation of the driving frequency when the oscillation amplitude of the oscillator is greater than the predetermined threshold. With the drive made in this manner, the resonance frequency can be detected more quickly as compared with the third working example.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-131351 filed May 17, 2007, for which is hereby incorporated by reference.

What is claimed is:
1. An oscillator device, comprising:
an oscillation system having a first oscillator and an elastic supporting member;
a detecting member configured to detect an oscillation amplitude of said first oscillator;
a driving member configured to drive said first oscillator; and
a control unit configured to generate a driving signal for driving said first oscillator and to supply the driving signal to said driving member,
wherein said control unit
 (i) reciprocally sweeps a driving frequency of the driving signal so that a resonance frequency of said oscillation system is included within a swept frequency range,
 (ii) determines a resonance frequency based on at least a frequency providing a maximum oscillation amplitude value in a frequency-increasing forward stroke of the reciprocal sweep and a frequency providing a maximum oscillation amplitude value in a frequency-decreasing backward stroke of the reciprocal sweep, and
 (iii) generates the driving signal based on the determined resonance frequency.

2. An oscillator device according to claim 1, wherein the frequency at which the oscillation amplitude value reaches a maximum in the forward stroke of the reciprocal sweeping is denoted by fmax1 and where the frequency at which the oscillation amplitude value reaches a maximum in the backward stroke of the reciprocal sweeping is denoted by fmax2, and said control unit determines a mean frequency based on fmax1 and fmax2, where the mean frequency is the resonance frequency of said oscillation system.

3. An oscillator device according to claim 1, wherein, after the driving frequency is swept by the forward stroke, said control unit sweeps the driving frequency by the backward stroke at a speed slower than a sweeping speed of the forward stroke.

4. An oscillator device according to claim 3, wherein, after the frequency with which the oscillation amplitude value reaches a maximum is passed in the forward stroke, said control unit stops the sweeping of the driving frequency as the oscillation amplitude starts to decrease, and wherein said control unit sweeps the driving frequency by the backward stroke from a frequency where the forward stroke sweeping was stopped, at a speed slower than the forward stroke sweeping speed and determines a frequency with which the oscillation amplitude value again reaches a maximum as the resonance frequency of said oscillation system.

5. An oscillator device according to claim 3, wherein, for sweeping the driving frequency, said control unit successively changes the driving frequency by a predetermined variation and holds the same driving frequency for a predetermined time after each variation is applied.

6. An oscillator device according to claim 5, wherein when the oscillation amplitude starts to decrease after the frequency with which the oscillation amplitude value reaches a maximum in the forward stroke is passed, said control unit stops the driving frequency sweeping, and sweeps the driving signal by the backward stroke from a frequency where the forward stroke sweeping was stopped, while successively changing the driving frequency by a predetermined variation which is smaller than the predetermined variation of the driving frequency in the forward stroke.

7. An oscillator device according to claim 6, wherein, in the backward stroke sweeping, said control unit stops the driving frequency sweeping when the oscillation amplitude starts to decrease after the frequency with which the oscillation amplitude value reaches a maximum in the backward stroke is passed, and wherein said control unit sweeps the driving signal again by a second forward stroke from a frequency where the backward stroke sweeping was stopped, while successively changing the driving frequency by a predetermined variation which is smaller than the predetermined variation of the driving frequency in the backward stroke sweeping.

8. An oscillator device according to claim 7, wherein said control unit repeats the reciprocal sweeping of the driving frequency until a variation of the driving frequency becomes smaller than a predetermined value.

9. An oscillator device according to claim 5, wherein when the oscillation amplitude of said first oscillator is smaller than a predetermined threshold the predetermined variation of the driving frequency is made greater than when the oscillation amplitude of said first oscillator is larger than the predetermined threshold.

10. An oscillator device according to claim 1, wherein said oscillation system further comprises a second oscillator, a first resilient support member configured to support said first oscillator relative to said second oscillator for oscillating motion about a torsional axis, and a second resilient support member configured to support said second oscillator relative to a support member for oscillating motion about the torsional axis.

11. An optical deflector, comprising:
an oscillator device as recited in any one of claims 1-10; and
an optical deflecting element provided at said oscillator device.

12. An image forming apparatus, comprising:
an optical deflector as recited in claim 11;
an optical system;
a light source; and
a photosensitive member;
wherein a light beam from said light source is scanningly deflected by said optical deflector, and the deflected scanning light beam is collected at a target position on said photosensitive member through said optical system.

13. An oscillator device, comprising:
an oscillation system having a first oscillator and an elastic supporting member;
a detecting member configured to detect an oscillation amplitude of said first oscillator;
a driving member configured to drive said first oscillator; and
a control unit configured to generate a driving signal for driving said first oscillator and to supply the driving signal to said driving member;
wherein said control unit
(i) reciprocally sweeps a driving frequency of the driving signal so that a resonance frequency of said oscillation system is included within a swept frequency range,
(ii) determines a resonance frequency based on at least a frequency providing a maximum oscillation amplitude value in a frequency-decreasing forward stroke of the reciprocal sweep and a frequency providing a maximum oscillation amplitude value in a frequency-increasing backward stroke of the reciprocal sweep, and
(iii) generates the driving signal based on the determined resonance frequency.

\* \* \* \* \*